(12) United States Patent
Makabe et al.

(10) Patent No.: US 6,262,208 B1
(45) Date of Patent: Jul. 17, 2001

(54) OCULAR LENS MATERIAL AND PROCESS FOR PRODUCING THE SAME

(75) Inventors: Takashi Makabe; Ikuo Omura, both of Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/264,004

(22) Filed: Mar. 8, 1999

(30) Foreign Application Priority Data

Mar. 6, 1998 (JP) .................................................. 10-073146

(51) Int. Cl.$^7$ .............................. C08F 18/20; G02C 7/04
(52) U.S. Cl. ........................................ 526/245; 351/160 H
(58) Field of Search ......................... 526/245; 351/160 H

(56) References Cited

U.S. PATENT DOCUMENTS

| | | | |
|---|---|---|---|
| 4,433,111 | * | 2/1984 | Tighe et al. ........................ 526/245 |
| 4,493,910 | * | 1/1985 | Tighe et al. ..................... 351/160 H |
| 4,954,587 | * | 9/1990 | Mueller ............................... 526/245 |
| 5,073,616 | * | 12/1991 | Futamura et al. ................... 526/264 |

FOREIGN PATENT DOCUMENTS 0 050 934   5/1982   (EP) .
9-278832  * 10/1997   (JP) .

OTHER PUBLICATIONS

Derwent Publications, Ltd., Derwent Abstracts, AN 014768, JP 09 278832, Oct. 28, 1997.

Derwent Publications, Ltd., Derwent Abstracts, AN 25044W, JP 05 003487, Jan. 14, 1975.

* cited by examiner

Primary Examiner—Donald R. Wilson
(74) Attorney, Agent, or Firm—Oblon, Spivak, McClelland, Maier & Neustadt, P.C.

(57) ABSTRACT

Ocular lens materials is made from copolymers prepared by polymerizing a monomer mixture containing:

(A) an N-vinyllactam;
(B) a fluorine-containing unsaturated monomer;
(C) a hydrophilic (meth)acrylamide;
(D) a crosslinking agent having at least 2 (meth) acryloyloxy groups; and
(E) a dicarboxylic acid divinyl ester.

These ocular lens materials and ocular lenses causing no elution and have a high water-retaining capability, oxygen permeability, are excellent in transparency, resistance to deposition, mechanical strength, flexibility, safety, durability, correction of visual acuity, and comfort during wear.

20 Claims, No Drawings

OCULAR LENS MATERIAL AND PROCESS FOR PRODUCING THE SAME

BACKGROUND OF THE INVENTION

1. Field of the Invention

The present invention relates to a material for ocular lenses and a process for producing the same. The present invention also relates to ocular lenses comprising the above ocular lens material and copolymers suitable as the ocular lens material. The ocular lens materials, as well as the ocular lenses, according to the present invention cause no or very little elution therefrom, and have a high water-retaining capability, oxygen permeability and excellent transparency, as well as resistance to deposition, mechanical strength and flexibility. As a result, the ocular lens materials and ocular lenses of the present invention correct visual acuity and have excellent durability, safety, comfort during wear and handleability, and are suitable as soft contact lens, intraocular lens and artificial crystal lens.

2. Description of the Background

Copolymer hydrogels principally comprising 2-hydroxyethyl methacrylate have been widely used for producing soft contact lenses. This is because 2-hydroxyethyl methacrylate copolymers, having excellent machine-cuttability and polishability, are easily processed into lenses, and the hydrogels obtained by hydration and swelling the copolymers have appropriate strength and flexibility.

However, hydrogels of 2-hydroxyethyl methacrylate copolymers have, in general, a low water content of less than 40% by weight and soft contact lenses formed therefrom have poor oxygen permeability. Soft contact lenses from the 2-hydroxyethyl methacrylate copolymers therefore fail to allow oxygen to be supplied to the cornea in a physiologically sufficient amount. Consequently, these soft contact lenses may, when worn for a long period of time, cause the cornea tissue to suffer from anoxia, which eventually leads to eye injury.

Attempts have therefore been made to develop a soft contact lens having high oxygen permeability and a material therefor, which can replace the 2-hydroxyethyl methacrylate copolymer hydrogels. Representative examples so far developed are as follows:

(1) A process for producing polymeric materials having a dually crosslinked structure usable for ocular lens. On producing a crosslinked polymer from two types of vinyl monomers which are hardly copolymerizable with each other, such as a combination of an N-vinyllactam and a (meth)acrylate, two types of crosslinking agents are used, one having a high copolymerizability with one of the two monomers, and the other with the counterpart monomer (Japanese Patent Application Laid-open Nos. 3487/1975 and 140594/1975).

(2) A soft contact lens with high water content obtained by copolymerizing a composition principally comprising methylacrylamide and a fluoroalkyl (meth)acrylate and then shaping the resulting copolymer (Japanese Patent Application Laid-open No. 293520/1988).

(3) A copolymer obtained by copolymerizing a polymerizable composition containing specific amounts of N,N-dimethylacrylamide and a specific fluoroalkyl (meth) acrylate and, as necessary, not more than a specific amount each of another copolymerizable vinyl monomer and a crosslinking agent; and a contact lens comprising the copolymer (Japanese Patent Application Laid-open No. 70713/1990, U.S. Pat. Nos. 4,954,587 and 5,011,275).

However, the polymeric material obtained by (1) has no resistance to deposition. This is essential for ocular lenses such as contact lens, and when a soft contact lens comprising the material is worn, significant deposition occurs. As a result, the lens may cause cornea injury or may not correct visual acuity sufficiently.

Furthermore, the contact lenses obtained by (2) and (3) have very low strength and readily break (no durability), and cannot be used in practice.

Contact lenses, which directly touch the eyes, are required to generate no eluates, in order to prevent eye injury and provide sufficient ability to correct visual acuity. The polymeric material obtained by (1), using the two types of crosslinking agents, can suppress the amount of eluate therefrom to some extent, but insufficiently.

There has been proposed, in order to provide a low-elution material for contact lenses:

(4) A process for producing hydrophilic polymers for soft contact lenses, which comprises polymerizing a methacrylic acid ester and an N-vinyllactam in the presence of a crosslinking agent, such as vinyl methacrylate, vinyl acrylate, triallyl isocyanulate or dicarboxylic acid divinyl esters (Japanese Patent Application Laid-open Nos. 105992/1977 and 74049/1978, U.S. Pat. No. 4,184,992). However, process (4) sometimes leads to formation of an opaque polymer, which is not satisfactory for ocular lenses requiring high transparency.

There has been strong demand for an ocular lens material suitable for soft contact lenses, having high water retaining capability and oxygen permeability, as well as excellent transparency, resistance to deposition, mechanical strength and flexibility, and which causes no elution. As a result of an intensive study to develop an ocular lens material having the above features, the present inventors had found the following materials and applied patents therefor (Japanese Patent Application Laid-open Nos. 134029/1994, 53639/1995, 239431/1996 and 278832/1997).

These materials include: (i) a hydrogel comprising a copolymer obtained by polymerizing a polymerizable hydrophilic monomer, N-hydroxymethylacrylamide and a crosslinking agent; (ii) a water-retaining ocular lens material comprising a copolymer of an N-vinyllactam and a specific fluoroalkyl (meth)acrylate; (iii) a water-retaining ocular lens material comprising a copolymer obtained by polymerizing a monomer mixture containing N-acryloylmorpholine, a fluorine-containing unsaturated monomer and a crosslinking agent; and (iv) an ocular lens material comprising a copolymer obtained by polymerizing a monomer mixture containing an N-vinyllactam, N,N-dimethylacrylamide, a fluoroalkyl (meth)acrylate and a crosslinking agent. These materials all have high water retaining capability and oxygen permeability, as well as excellent transparency, resistance to deposition, strength and flexibility and are hence very suitable as materials for ocular lenses, such as soft contact lens.

SUMMARY OF THE INVENTION

The present inventors, taking the above results into account, made a further study and found the following fact: Copolymers obtained by polymerizing a monomer mixture comprising the specific 5 types of monomers, i.e. an N-vinyllactam, a fluorine-containing unsaturated monomer, a hydrophilic (meth)acrylamide, a crosslinking agent having at least two (meth)acryloyloxy groups and a dicarboxylic acid divinyl ester, have high water-retaining capability and oxygen permeability, as well as excellent transparency, resistance to deposition, strength and flexibility and, further, cause no or very little elution to water or alcohol, thus proving excellent in safety and ability of correcting visual acuity. Accordingly, the copolymers are markedly suitable as materials for ocular lenses such as soft contact lens.

The present inventors further found that, on producing the above copolymers, use of a specific thermally decomposable initiator insures still better suppression of elution from the resulting copolymers, and completed the invention based on these findings.

The present invention provides an ocular lens material comprising a copolymer obtainable by polymerizing a monomer mixture comprising:
(A) an N-vinyllactam (hereinafter referred to as "N-vinyllactam (A)");
(B) a fluorine-containing unsaturated monomer (hereinafter referred to as "fluorine-containing unsaturated monomer (B)");
(C) a hydrophilic (meth)acrylamide (hereinafter referred to as "hydrophilic (meth)acrylamide (C)");
(D) a crosslinking agent having at least two (meth)acryloyloxy groups (hereinafter referred to as "(meth)acryl-based crosslinking agent (D)"); and
(E) a dicarboxylic acid divinyl ester (hereinafter referred to as "dicarboxylic acid divinyl ester (E)").

The present invention also provides an ocular lens comprising the above ocular lens material.

The present invention further provides a process for producing ocular lens materials, which comprises polymerizing the above monomer mixture comprising the N-vinyllactam (A), fluorine-containing unsaturated monomer (B), hydrophilic (meth)acrylamide (C), (meth)acryl-based crosslinking agent (D) and dicarboxylic acid divinyl ester (E), with a thermally decomposable initiator having a 10-hour half-life temperature of at least 50° C.

The present invention still further provides a copolymer obtainable by polymerizing the above monomer mixture comprising the N-vinyllactam (A), fluorine-containing unsaturated monomer (B), hydrophilic (meth)acrylamide (C), (meth) acryl-based crosslinking agent (D) and dicarboxylic acid divinyl ester (E).

DETAILED DESCRIPTION OF THE INVENTION

The ocular lens material of the present invention comprises a copolymer obtainable by polymerizing the monomer mixture comprising an N-vinyllactam (A), a fluorine-containing unsaturated monomer (B), a hydrophilic (meth)acrylamide (C), a (meth)acryl-based crosslinking agent (D) and a dicarboxylic acid divinyl ester (E).

The N-vinyllactam (A) used in the present invention contributes to providing the resulting copolymer with high water-retaining capability, and increases the oxygen permeability and mechanical strength of the resulting copolymer hydrogel. In the present invention, any cyclic compound having in the ring thereof an atomic group represented by the formula —CON(CH=CH$_2$)— can be used as the N-vinyllactam with no specific limitation. Examples of N-vinyllactams (A) usable in the present invention include N-vinyl-β-propiolactams, N-vinyl-γ-butyrolactams (N-vinyl-2-pyrrolidones), N-vinyl-δ-valerolactams (N-vinyl-2-piperidones) and N-vinyl-ε-caprolactams.

More concretely, examples of N-vinyllactams (A) usable in the present invention are N-vinyl-2-pyrrolidones, e.g. N-vinyl-2-pyrrolidone, N-vinyl-3-methyl-2-pyrrolidone, N-vinyl-4-methyl-2-pyrrolidone, N-vinyl-5-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl-5-methyl-5-ethyl-2-pyrrolidone and N-vinyl-3,3,5-trimethyl-3-ethyl-2-pyrrolidone; N-vinyl-2-piperidones, e.g. N-vinyl-2-piperidone, N-vinyl-3-methyl-2-piperidone, N-vinyl-4-methyl-2-piperidone, N-vinyl-5-methyl-2-piperidone, N-vinyl-6-methyl-2-piperidone. N-vinyl-6-ethyl-2-piperidone, N-vinyl-3,5-dimethyl-2-piperidone and N-vinyl-4,4-dimethyl-2-piperidone; and N-vinyl-ε-caprolactams, e.g. N-vinyl-ε-caprolactam, N-vinyl-3-methyl-ε-caprolactam, N-vinyl-4-methyl-ε-caprolactam, N-vinyl-7-methyl-ε-caprolactam, N-vinyl-7-ethyl-ε-caprolactam, N-vinyl-3,5-dimethyl-ε-caprolactam, N-vinyl-3,5-diethyl-ε-caprolactam, N-vinyl-4,6-dimethyl-ε-caprolactam and N-vinyl-3,5,7-trimethyl-ε-caprolactam. In the present invention, these N-vinyllactams may be used either singly or in combination of two or more as the N-vinyllactam (A). Among these N-vinyllactams, either one or both of N-vinyl-2-pyrrolidone and N-vinyl-2-piperidone is preferably used as the N-vinyllactam (A) in the invention.

The fluorine-containing unsaturated monomer (B) used in the present invention contributes to providing the resulting ocular lens material and ocular lenses therefrom, in particular contact lens, with good resistance to deposition, which prevents deposition of substances such as protein on the lenses, and increases the mechanical strength of the lenses. As the fluorine-containing unsaturated monomer (B), the fluoroalkyl esters of (meth) acrylic acid, i.e. fluoroalkyl (meth) acrylates, are preferably used. Among fluoroaklyl (meth)acrylates, those with the fluoroalkyl group forming the ester having 2 to 15 carbon atoms are preferably used, since the copolymers obtained by polymerization of the resulting monomer mixture, as well as the ocular lens materials obtained therefrom, will have still better transparency.

Examples of fluoroalkyl (meth) acrylates preferably usable in the present invention are 2,2,2-trifluoroethyl (meth)acrylate, 2,2,3,3-tetrafluoropropyl (meth)acrylate, 3,3,4,4-tetrafluorobutyl (meth)acrylate, 1,1,1,3,3,3-hexafluoroisopropyl (meth)acrylate, 2,2,3,4,4,4-hexafluorobutyl (meth)acrylate, 2,2,3,3,4,4,5,5-octafluoropentyl (meth)acrylate, 3,3,4,4,5,5,5-heptafluoropentyl (meth)acrylate, 3,3,4,4,5,5,6,6,6-nonafluorohexyl (meth)acrylate, 2,2,3,3,4,4,5,5,6,6,7,7-dodecafluoroheptyl (meth)acrylate, 2,2,3,3,4,4,5,5,6,6,7,7,8,8,9,9-hexadecafluorononyl (meth)acrylate, 5-trifluoromethyl-3,3,4,4,5,6,6-octafluorohexyl (meth) acrylate and 2,2,3,3,3-pentafluoropropyl (meth)acrylate. These fluoroalkyl (meth)acrylates may be used either singly or in combinations of two or more.

In the present invention, among these fluoroalkyl (meth) acrylates, in particular those represented by the following general formula (I) are preferably used, since such fluoroalkyl (meth)acrylates can provide water-retaining ocular lens materials, as well as ocular lenses therefrom, having still better optical transparency.

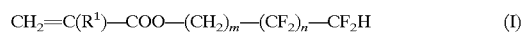

$$CH_2=C(R^1)—COO—(CH_2)_m—(CF_2)_n—CF_2H \qquad (I)$$

wherein $R^1$ represents a hydrogen atom or methyl group, and m and n represent an integer of 1 to 4 and 1 to 10, respectively.

Examples of the fluoroalkyl (meth)acrylates represented by the above general formula (I) are 2,2,3,3-tetrafluoropropyl (meth)acrylate, 3,3,4,4-tetrafluorobutyl (meth)acrylate, 2,2,3,3,4,4,5,5-octafluoropentyl (meth)

acrylate, 2,2,3,3,4,4,5,5,6,6,7,7-dodecafluoroheptyl (meth) acrylate and 2,2,3,3,4,4,5,5,6,6,7,7,8,8,9,9-hexadecafluorononyl (meth)acrylate.

In the present invention, there may be used as the fluorine-containing unsaturated monomer (B), fluoroalkyl (meth) acrylates with their fluoroalkyl group having a hydroxyl group, either singly or in combination with the above fluoroalkyl (meth)acrylates having no hydroxyl group. Use of such fluoroaklyl (meth)acrylates with the fluoroalkyl group having a hydroxyl group, which have high copolymerizability with N-vinyllactam (A) and hydrophilic (meth)acrylamide (C), increases the content of the structural unit from the fluorine-containing unsaturated monomer (B), thereby providing the resulting ocular lens materials with still better resistance to deposition, optical transparency and mechanical strength.

Examples of fluoroalkyl (meth)acrylates with their fluoroalkyl group having a hydroxyl group are 3-(perfluorobutyl)-2-hydroxypropyl (meth)acrylate, 3-(perfluorohexyl)-2-hydroxypropyl (meth)acrylate, 3-(perfluorooctyl)-2-hydroxypropyl (meth)acrylate, 3-(perfluoro-3-methylbutyl)-2-hydroxypropyl (meth) acrylate, 3-(perfluoro-3-methylhexyl)-2-hydroxypropyl (meth)acrylate and 3-(perfluoro-3-methyloctyl-2-hydroxypropyl (meth)acrylate. These fluoroalkyl (meth) acrylates may be used either singly or in combinations of two or more.

The hydrophilic (meth)acrylamide (C) used in the present invention contributes to increasing the hydrophilic property and oxygen permeability and minimizes decreases in the mechanical strength, of the resulting ocular lens material and ocular lenses therefrom, and provides good flexibility to the material and ocular lenses therefrom.

In the present invention, all hydrophilic (meth) acrylamides can be used as the hydrophilic (meth) acrylamide (C). Among these, those represented by the following general formula (II) are preferably used:

$$CH_2=C(R^2)—CO—N(R^3)(R^4) \quad (II)$$

wherein $R^2$ represents a hydrogen atom or methyl group, and $R^3$ and $R^4$ each independently represents a hydrogen atom, an alkyl group having 1 to 4 carbon atoms or an alkyl group with a hydroxyl group having 1 to 4 carbon atoms, or $R^3$ and $R^4$ together represent an alkylene group represented by the formula —$(CH_2)_p$— (wherein p is an integer of 4 to 6) or a divalent group represented by the formula —$(CH_2)_2$—O—$(CH_2)_2$—. With the hydrophilic (meth)acrylamide (C) represented by the general formula (II), where $R^3$ and $R^4$ together form an alkylene group represented by the formula —$(CH_2)_p$— (wherein p is as defined above) or a divalent group represented by the formula —$(CH_2)_2$—O—$(CH_2)_2$—, these divalent groups each forms, together with the nitrogen atom of the hydrophilic (meth)acrylamide (C) a heterocycle having a nitrogen atom.

Concrete examples of hydrophilic (meth)acrylamides preferably used in the present invention are (meth) acrylamide, N,N-dimethyl(meth)acrylamide, N,N-diethyl (meth)acrylamide, N-methyl(meth)acrylamide, N-ethyl (meth)acrylamide, N-propyl(meth)acrylamide, N-hydroxymethyl(meth)acrylamide, N-hydroxyethyl(meth) acrylamide and N-(meth)acryloylmorpholine. These hydrophilic (meth)acrylamides may be used either singly or in combinations of two or more. Among these, in the present invention, acrylamide, N-hydroxymethylacrylamide, N,N-dimethylacrylamide and/or N-acryloylmorpholine are preferably used as the hydrophilic (meth)acrylamide (C), in view of the hydrophilic property, flexibility and mechanical strength. In particular, N-acryloylmorpholine is more preferably used in view of, in addition to the above features, cuttability.

Finally in the present invention, it is necessary to use together with the above N-vinyllactam (A), fluorine-containing unsaturated monomer (B) and hydrophilic (meth) acrylamide (C), two specific types of crosslinking agents: a (meth)acryl-based crosslinking agent (D) and a dicarboxylic acid divinyl ester (E).

The vinyl group present in the N-vinyllactam (A) generally has poor copolymerizability with the (meth)acryloyl group present in fluoroalkyl (meth)acrylates preferably used as the fluorine-containing unsaturated monomer (B) or in the hydrophilic (meth)acrylamide (C). As a result, a mixture comprising an N-vinyllactam (A), a fluorine-containing unsaturated monomer (B) (fluoroalkyl (meth)acrylate) and a hydrophilic (meth)acrylamide will, when polymerized as it is, tend to yield, separately, a polymer principally containing the N-vinyllactam (A) and one principally containing the fluorine-containing unsaturated monomer (B) (fluoroalkyl (meth)acrylate) and hydrophilic (meth)acrylamide (C).

If either one of the (meth)acryl-based crosslinking agent (D) and dicarboxylic acid divinyl ester (E) is, alone, added to a mixture of an N-vinyllactam (A), a fluorine-containing unsaturated monomer (B) (fluoroalkyl (meth)acrylate) and a hydrophilic acrylamide (C), the resulting polymer principally comprising the N-vinyllactam (A) will hardly be crosslinked, while the other resulting polymer principally comprising the fluorine-containing unsaturated monomer (B) (fluoroalkyl (meth)acrylate) and the hydrophilic acrylamide (C) will be crosslinked; or, the resulting polymer principally comprising the N-vinyllactam (A) will be crosslinked, while the other resulting polymer principally comprising the fluorine-containing unsaturated monomer (B) (fluoroalkyl (meth)acrylate) and the hydrophilic acrylamide (C) will hardly be crosslinked. In both cases, the polymer mixture will cause significant elution.

Likewise, use of, as described in the above Japanese Patent Application Laid-open No. 105992/1977, a vinyl methacrylate having both methacryloyl group and vinyl group as a crosslinking agent tends to lead to phase separation of a polymer principally comprising the N-vinyllactam (A) and another polymer principally comprising the fluorine-containing unsaturated monomer (B) (fluoroalkyl (meth)acrylate) and the hydrophilic acrylamide (C). In this case, the copolymer obtained by the polymerization would become opaque.

In contrast, in the present invention, selection of the two specific types of (meth) acryl-based crosslinking agent (D) and dicarboxylic acid divinyl ester (E) is made and the two are used together and added to a monomer mixture comprising an N-vinyllactam (A), a fluorine-containing unsaturated monomer (B) and a hydrophilic (meth)acrylamide (C). Then, the resulting copolymer for ocular lens material is entirely crosslinked in a good manner, causing no phase separation, so that the copolymer does not become opaque, thus having excellent transparency, and causing no or very little elution.

The (meth)acryl-based crosslinking agent (D) used in the present invention is a compound obtainable by reacting a compound having at least 2 hydroxyl groups with acrylic acid and/or methacrylic acid and by esterifying the at least 2 hydroxyl groups with the (meth)acrylic acid, i.e. a compound having at least 2 (meth)acryloyloxy groups.

In the present invention, compounds obtainable by esterifying the at least 2 hydroxyl groups present in a polyhydric alcohol with (meth) acrylic acid are preferably used as the (meth)acryl-based crosslinking agent (D). Concrete examples are alkylene glycol di(meth)acrylates, e.g. ethylene glycol di(meth)acrylate, 2-acryloyloxyethyl (meth)acrylate, 1,4-butanediol di(meth)acrylate, 1,6-hexanediol di(meth)acrylate, 1,9-nonanediol di(meth)acrylate, 1,10-decanediol di(meth)acrylate and neopentyl glycol di(meth)acrylate; polyalkylene glycol di(meth)acrylates, e. g. diethylene glycol di(meth)acrylate, triethylene glycol di(meth)acrylate, tetradecaethylene glycol di(meth)acrylate, polyethylene glycol di(meth)acrylate and polypropylene glycol di(meth)acrylate; trimethylolpropane tri(meth)acrylate and 2,2-bis {p-(γ-methacryloyloxy-β-hydroxypropoxy)phenyl} propane. These (meth)acryl-based crosslinking agent may be used singly or in combinations of two or more. Among the above, in the present invention, ethylene glycol di(meth)acrylate, 1,6-hexanediol di(meth)acrylate, 1,10-decanediol di(meth)acrylate and diethylene glycol di(meth)acrylate are preferably used as the (meth)acryl-based crosslinking agent (D) in view of mechanical strength and flexibility.

In the present invention, any one of aliphatic dicarboxylic acid divinyl esters, alicyclic dicarboxylic acid divinyl esters and aromatic dicarboxylic acid divinyl esters can be used as the dicarboxylic acid divinyl ester (E). Concrete examples are divinyl succinate, divinyl glutarate, divinyl adipate, divinyl maleate, divinyl cyclohexane-1,4-dicarboxylate, divinyl phthalate, divinyl isophthalate and divinyl terephthalate. These dicarboxylic acid divinyl esters may be used singly or in combinations of two or more. Among the above, divinyl adipate and divinyl phthalate are preferably used as the dicarboxylic acid divinyl ester (E) in the present invention, in view of mechanical strength and flexibility.

In the present invention, in order to obtain, smoothly and surely, ocular lens materials having high water-retaining capability and oxygen permeability, excellent transparency, resistance to deposition, mechanical strength and flexibility, and which causes no elution, it is desirable to produce copolymers (ocular lens materials) from a monomer mixture containing, based on the total weight thereof, 35 to 70% by weight of the above N-vinyllactam (A), 20 to 50% by weight of the fluorine-containing unsaturated monomer (B), 5 to 40% by weight of the hydrophilic (meth)acrylamide (C), 0.01 to 1% by weight of the (meth)acryl-based crosslinking agent (D) and 0.01 to 1% by weight of the dicarboxylic acid divinyl ester (E). It is more preferable to produce copolymers by using a monomer mixture containing 45 to 65% by weight of the N-vinyllactam (A), 20 to 40% by weight of fluorine-containing unsaturated monomer (B), 10 to 30% by weight of hydrophilic (meth)acrylamide (C), 0.2 to 0.75% by weight of (meth)acryl-based crosslinking agent (D) and 0.2 to 0.75% by weight of dicarboxylic acid divinyl ester (E).

If the content of the N-vinyllactam (A) in the monomer mixture is less than 35% by weight, the resulting copolymer, as well as the ocular lens material therefrom, will tend to have a low water-retaining capability and oxygen permeability. On the other hand, if the content exceeds 70% by weight, the resulting copolymer and ocular lens material will tend to have a low mechanical strength, thereby losing durability.

If the content of the fluorine-containing monomer (B) in the monomer mixture is less than 20% by weight, the resulting copolymer, as well as the ocular lens material therefrom, will tend to have poor mechanical strength, resistance to deposition and oxygen permeability. On the other hand, if the content exceeds 50% by weight, the resulting copolymer and ocular lens material will tend to have low water-retaining capability and flexibility.

If the content of the hydrophilic (meth)acrylamide (C) in the monomer mixture is less than 5% by weight, the resulting copolymer, as well as the ocular lens material therefrom, will tend to have low flexibility. On the other hand, if the content exceeds 40% by weight, the resulting copolymer and ocular lens material will tend to have a low mechanical strength and lose durability.

It is further desirable that the total content of the N-vinyllactam (A) and the hydrophilic (meth)acrylamide (C) in the monomer mixture be within the range of 40 to 80% by weight based on the total weight of the monomer mixture. This range will lead to producing more smoothly ocular lens materials having high water-retaining capability and oxygen permeability and excellent transparency, resistance to deposition, mechanical strength and flexibility and which causes no elution. The content is more preferably within the range of 55 to 75% by weight.

If the total content of the N-vinyllactam (A) and the hydrophilic (meth) acrylamide (C) in the monomer mixture is less than 40% by weight, the resulting copolymer, as well as the ocular lens material therefrom, will tend to have low water-retaining capability and oxygen permeability. On the other hand, if the total content exceeds 80% by weight, the resulting copolymer and ocular lens material will tend to have too high of a water-retaining capability and low mechanical strength.

If the content of the (meth)acryl-based crosslinking agent (D) or the dicarboxylic acid divinyl ester (E) is less than 0.01%, which is outside the above range, the resulting copolymer, as well as the ocular lens material therefrom, will tend to generate a large amount of eluate therefrom. On the other hand, if the content each exceeds 1% by weight, the resulting copolymer and ocular lens material will tend to have a low water-retaining capability and flexibility.

Further with the monomer mixture, the total content of the (meth)acryl-based crosslinking agent (D) and the dicarboxylic acid divinyl ester (E) is desirably within the range of 0.02 to 2% by weight based on the total weight of the monomer mixture, more preferably within the range of 0.4 to 1.5% by weight on the same basis.

If the total content of the (meth)acryl-based crosslinking agent (D) and the dicarboxylic acid divinyl ester (E) is less than 0.02%, the resulting copolymer, as well as the ocular lens material therefrom, will tend to generate a large amount of eluate therefrom. On the other hand, if the total content exceeds 2% by weight, the resulting copolymer and ocular lens material will tend to have a low water-retaining capability and flexibility.

The monomer mixture used in the present invention may contain, besides the above monomers, other copolymerizable monomers and/or polymers within limits not to impair the purpose of the invention.

Examples of usable other monomers are aliphatic vinyl esters, e.g. vinyl acetate, vinyl butyrate and vinyl laurate; itaconic acid diesters, e.g. dimethyl itaconate and diethyl itaconate; and unsaturated carboxylic acids, e.g. (meth)acrylic acid and itaconic acid. Examples of other usable polymers are polyvinyl alcohol, polyvinylpyrrolidone, polymethyl (meth)acrylate, polyorganosiloxanes and derivatives of the foregoing obtained by introducing a polymerizable group such as a vinyl group. These other monomers and polymers may be used either singly or in combinations of two or more. On incorporation of these monomers and/or polymers into the monomer mixture, it is desirable that the content be not more than about 10% by weight based on the total weight of the monomer mixture (where polymers are incorporated, total weight of all monomers and polymers), which insures production of copolymers and ocular lens materials having the above excellent features.

Further in the present invention, a color may be added to the monomer mixture on production of copolymers, in order to obtain colored ocular lens materials.

The copolymers and ocular lens materials of the present invention can be produced by polymerizing a monomer mixture containing the above N-vinyllactam (A), fluorine-containing unsaturated monomer (B), hydrophilic (meth) acrylamide (C), (meth)acryl-based crosslinking agent (D) and dicarboxylic acid divinyl ester (E) as essential components and, as necessary, other monomers and/or polymers preferably in an amount of not more than the above range.

On conducting the polymerization, any process generally employed for polymerizing unsaturated monomers is usable with no specific limitation. Typically, the polymerization is conducted with either one or both of a thermally decomposable initiator and an energy beam (such as light)-decomposable initiator. Of the two, use of a thermally decomposable initiator to conduct heat polymerization of the above monomer mixture is desirable, which insures production of copolymers and ocular lens materials which causes no elution.

On conducting heat polymerization of the monomer mixture with a thermally decomposable initiator, it is desirable to use a constant-temperature bath, a hot air circulating heating apparatus or the like, with which the temperature can be controlled easily. Examples of the thermally decomposable initiator are peroxide-based thermally decomposable initiators, e.g. benzoyl peroxide, isopropyl peroxide, lauryl peroxide and methyl ethyl ketone peroxide; and azo-based thermally decomposable initiators, e.g. 2,2'-azobisisobutyronitrile, 2,2'-azobismethyl isobutyrate, 2,2'-azobisdimethylvaleronitrile, 2,2'-azobisisobutylamide and dimethyl 2,2'-azobisisobutyrate. These thermally decomposable initiators may be used singly or in combinations of two or more.

With the monomer mixture used in the present invention, the polymerizability of the fluorine-containing unsaturated monomer (B) (fluoroalkyl (meth)acrylate) or the hydrophilic (meth)acrylamide (C) differs from that of the N-vinyllactam (A). As a result, at early stages of polymerization, the fluorine-containing unsaturated monomer (B) and hydrophilic (meth)acrylamide (C), which are readily reactable with the polymerization initiator used, tends mainly to polymerize; and then, at later stages of polymerization, the N-vinyllactam (A) polymerizes. In order to obtain a copolymer causing no elution, in which all monomers contained in the monomer mixture are completely polymerized and crosslinked, it becomes therefore necessary to conduct sufficient polymerization not only at early stages but also at later stages.

In order to make the polymerization proceed evenly at early stages through later stages, it is necessary to use a thermally decomposable initiator capable of maintaining its activity during heat polymerization, and to control the viscosity at a low level (keeping high flowability) of the polymerization mixture by adjusting the polymerization temperature above a prescribed level, thereby facilitating polymerization of the monomers.

In view of the above, on production of the ocular lens materials (copolymers) of the present invention by polymerizing a monomer mixture comprising an N-vinyllactam (A), a fluorine-containing unsaturated monomer (B), a hydrophilic (meth)acrylamide (C), a (meth)acryl-based crosslinking agent (D) and a dicarboxylic acid divinyl ester (E), it is desirable to use a thermally decomposable initiator having a 10-hour half-life temperature of at least 50° C. Any thermally decomposable initiator having a 10-hour half-life temperature of at least 50° C. can be used for this purpose. Examples of such initiators are azo-based thermally decomposable initiators, e.g. 2,2'-azobisisobutyronitrile, 2,2'-azobisisobutylamide and dimethyl 2,2'-azobisisobutyrate.

The polymerization temperature for the above monomer mixture is desirably at least 40° C., which maintains the viscosity of polymerization mixture at a low level, so that the flowability of the reaction mixture will not be lost.

The "10-hour half-life temperature" referred to in the present invention means the temperature at which the activity of the thermally decomposable initiator used decreases to half the initial value after 10 hours. In other words, the higher the 10-hour half-life temperature of a thermally decomposable initiator, the longer its activity is maintained under heating during polymerization.

It is desirable that the amount of the initiator used, whether it may be a thermally decomposable initiator or an energy beam-decomposable initiator, be 0.01 to 5% by weight based on the total weight of the monomer mixture.

The above described process can give ocular lens materials (copolymers) that cause no or very little elution, have high water-retaining capability, and oxygen permeability, and have excellent transparency, resistance to deposition, mechanical strength and flexibility. The resulting ocular lens materials are suitable for producing ocular lenses, such as soft contact lenses, intraocular lenses and artificial crystal lenses, in particular soft contact lenses.

The ocular lens materials (copolymers) of the present invention may be used as they are without being subjected to cutting or polishing, circulated or put on the market; or they may be shaped into ocular lenses and then circulated and put on the market.

The water-retainable ocular lens materials (copolymers) of the present invention can yield ocular lenses by any of the usual processes having been employed for producing plastic ocular lenses, with no specific limitation. Thus, ocular lenses can, for example, be produced by the following processes:

(1) The lathe-cut process which comprises polymerizing a monomer mixture comprising as essential components an N-vinyllactam (A), a fluorine-containing unsaturated monomer (B) a hydrophilic (meth)acrylamide (C), a (meth)acryl-based crosslinking agent (D) and a dicarboxylic acid divinyl ester (E) and, as necessary, other monomers, polymers, colorants and the like; shaping the resulting copolymer into a prescribed shape (such as a sheet, plate or block) and then cutting and polishing the shape, to produce ocular lenses;

(2) The mold process which comprises filling a mold having a cavity corresponding to the desired ocular lens, with the above monomer mixture and polymerizing and shaping the ocular lens in the mold; and (3) The spin-cast process which comprises dropping the above monomer mixture onto the surface of a mold rotating at a high speed to cast and spread the monomer mixture radially and, at the same time, polymerize and shape the monomer mixture, to produce ocular lenses.

Swelling by immersion of the ocular lenses obtained above in an aqueous solution such as physiological saline solution or distilled water can produce water-retaining contact lenses such as soft contact lens, intraocular lenses and artificial crystal lenses. The ocular lens materials or ocular lenses preferably have a water content of at least 50% by weight, more preferably in a range of 50 to 85% by weight, most preferably in a range of 55 to 75% by weight, in view of flexibility and mechanical strength.

The ocular lenses thus obtained cause no or very little elution, generally having an elution ratio when immersed in distilled water at 20° C. for 72 hours of less than 0.5% by weight (substantially 0% by weight). These ocular lenses have a high water content of at least 50% by weight, a high tensile strength of at least 150 kg/mm², an optimum Young's modulus for ocular lens of from 35 to 150 g/mm², a high oxygen permeability of at least $40 \times 10^{-11}$ cc·cm/cm²·sec·mmHg and a high light transmittance of at least 90%, and are excellent in mechanical strength, flexibility, durability, resistance to decomposition, comfort during wear, transparency, ability to correcting visual acuity and safety.

The water-retaining ocular lens materials and ocular lenses formed therefrom according to the present invention comprising copolymers obtainable by polymerizing a monomer mixture comprising an N-vinyllactam (A), a fluorine-containing unsaturated monomer (B), a hydrophilic (meth)acrylamide (C), a (meth)acryl-based crosslinking agent (D) and a dicarboxylic acid divinylester (E) cause no or very little elution therefrom. Thanks to this feature, ocular lenses formed from the ocular lens materials of the present invention can be used, as they are without being subjected to extraction treatment to extract eluates therefrom, as ocular lenses, such as soft contact lens, having excellent safety, comfort during wear and ability of correcting visual acuity.

Furthermore, the ocular lens materials and ocular lenses of the present invention have a high water-retaining capability and oxygen permeability, as well as high light transmittance, low haze value, high transparency, good resistance to deposition, and, also have high mechanical strength and flexibility. The ocular lenses are therefore most suited as soft contact lens, intraocular lens and artificial crystal lens, in particular as soft contact lens. The process of the present invention, which comprises polymerizing the above monomer mixture with a thermally decomposable initiator having a 10-hour half-life temperature of at least 50° C., can smoothly produce copolymers, which are ocular lens materials, having the above excellent features, in particular causing no elution.

EXAMPLES

Other features of the invention will become apparent in the course of the following detailed descriptions of exemplary embodiments which are given for illustration of the invention and are not intended to be limiting thereof. In the Examples and Comparative Examples that follow, the water-retaining capability, tensile strength and Young's modulus of ocular lens materials, the oxygen permeability (oxygen transmission rate) transparency (light transmittance and haze value), resistance to deposition and amount of eluates (elution ratio) of ocular lenses (soft contact lenses) were tested or evaluated by the following methods.

Water-Retaining Capability of Ocular Lens Material

The ocular lens material comprising a copolymer (for producing soft contact lens) obtained in each of the following Examples and Comparative Examples was cut into a round film-like test specimen having a diameter of 15 mm and a thickness of 0.2 mm. The specimen was immersed in physiological saline solution at 25° C. for at least overnight and water-swollen to saturation. After the specimen had been taken out from the physiological saline solution, the excess water adhering to the surface was swiftly removed with a sheet of absorbing paper. The specimen was then tested for the weight (Wa). The water-swollen specimen was then dried at 100° C. to a constant weight and again the weight (Wb) was measured. The water content was obtained with the following formula and taken as a measure of the water-retaining capability.

Water content(% by weight)=$\{(Wa-Wb)/Wa\} \times 100$

Tensile Strength and Young's Modulus of Ocular Lens Material

The ocular lens material comprising a copolymer (for producing soft contact lens) obtained in each of the following Examples and Comparative Examples was cut into strip-shaped specimens having a length of 10 mm, a thickness of 0.3 mm and a width of 2 mm. The specimen was fixed by both ends thereof with pinches of a tensile tester (AUTOGRAPH IM-100, made by Shimadzu Corporation) and elongated at an extension rate of 50 mm/min in distilled water to breakage. The stress at the breakage was read and taken as the tensile strength.

The Young's modulus (modulus of tensile elasticity) was calculated from the slope of the tangential line at the deformation starting point of the tensile stress-strain curve obtained in the above tensile test.

Oxygen Transmission Rate of Soft Contact Lens (1) The ocular lens material comprising a copolymer (for producing soft contact lens) obtained in each of the following Examples and Comparative Examples was cut into disks having a diameter of 15 mm and a thickness of 10 mm. The disks were cut and polished in the usual manner into 4 soft contact lenses having a base curve of 8.7 mm, a power of 0 diopter, a diameter of 13.5 mm and a thickness each of 0.05 mm, 0.10 mm, 0.15 mm and 0.20 mm.

(2) The soft contact lenses prepared in the above (1) were tested for oxygen permeability in distilled water at 35° C. with a SEIKAKEN type film oxygen transmission tester (made by Riken Seiki Kogyo Co., Ltd.). The obtained data were plotted on a graph with the X-axis representing the inverse of the thickness and the Y-axis the inverse of the oxygen transmission rate, and a linear regression line was drawn. The Y-intercept of the line was read and its inverse was taken as the oxygen transmission rate of the ocular lens (soft contact lens).

Transparency of Soft Contact Lens (Light Transmittance and Haze Value)

(1) The ocular lens material comprising a copolymer (for producing soft contact lens) obtained in each of the following Examples and Comparative Examples was cut into a disk having a diameter of 15 mm and a thickness of 10 mm. The disks were each cut and polished in the usual manner into a soft contact lens having a base curve of 8.7 mm, a power of 0 diopter, a diameter of 13.5 mm and a thickness of 0.20 mm.

(2) The soft contact lens prepared in (1) above was, while being immersed in distilled water at 25° C., tested with a haze meter (MODEL TC-HIII, made by Tokyo Denshoku Co., Ltd.), using a halogen lamp as the light source. The luminosity of incident light (T1), that transmitted through the soft contact lens and distilled water (T2), that was diffused by the distilled water (T3), and that was diffused by the soft contact lens and distilled water (T4), were measured, to obtain the light transmittance and haze value with the following formulas:

Light transmittance(%)=(T2/T1)×100

Haze value=$\{(T1/T2)-(T3/T4)\} \times 100$

Resistance to Deposition of Soft Contact Lens (1) The ocular lens material comprising a copolymer (for producing soft contact lens) obtained in each of the following Examples and Comparative Examples was cut into a disk having a diameter of 15 mm and a thickness of 10 mm. The disk was cut and polished in the usual manner into a soft contact lens having a base curve of 8.7 mm, a power of 0 diopter, a diameter of 13.5 mm and a thickness of 0.20 mm.

(2) The soft contact lens prepared in (1) above was worn by a white rabbit for 2 days continuously. After the wear, the lens was taken out and projected through a magnifying projector (magnification: 10 times), and the projected image was evaluated visually. The following rating was used to show the results of evaluation:

Good (O): No deposit is visible; and
Bad (X): Deposits are clearly seen.

Amount of Eluates from Soft Contact Lens (Elution Ratio)

(1) The ocular lens material comprising a copolymer (for producing soft contact lens) obtained in each of the following Examples and Comparative Examples was cut into 18 disks having a diameter of 15 mm and a thickness of 10 mm. The disks were cut and polished in the usual manner into soft contact lenses having a base curve of 8.7 mm, a power of 0 diopter, a diameter of 13.5 mm and a thickness of 0.20 mm. The soft contact lenses were tested for the total dry weight (Wc) of 9 sheets.

(2) The 9 soft contact lenses prepared in (1) above were immersed in 6 ml of distilled water at 20° C. for 72 hours, then taken out, dried and measured for the total dry weight (Wd). The amount of eluates (elution ratio) when immersed in distilled water was obtained with the following formula:

Elution ratio in distilled water(%)={(Wc−Wd)/Wc}×100

(3) Separately, the remaining 9 sheets of the soft contact lenses were immersed in 6 ml of methanol at 20° C. for 72 hours, then taken out, dried and measured for the total dry weight (We) of 9 sheets. The amount of eluates (elution ratio) when immersed in methanol was obtained with the following formula:

Elution ratio in methanol(%)={(Wc−We)/Wc}×100

Examples 1 through 12

(1) To 10.0 g each of the monomer mixtures shown in Table 2 below, 0.01 g of dimethyl 2,2'-azobisisobutyrate as a thermally decomposable initiator was added. The resulting mixtures were each placed in a polypropylene test tube (capacity: 20 ml) and, after the air inside the tube had been replaced with nitrogen, the tubes were tightly sealed. The tubes were then immersed in a constant-temperature water bath at 55° C. for 24 hours to effect polymerization, and then transferred to a hot air circulating heating apparatus at 100° C., where the tubes were kept for 2 hours to complete polymerization. After cooling, the resulting copolymers were taken out from the tubes.

(2) The copolymers obtained in (1) above were each formed into test specimens (ocular lens materials) and soft contact lenses, by the methods described above, and then tested or evaluated for the water-retaining capability, tensile strength, Young's modulus, oxygen permeability, transparency (light transmittance and haze value), resistance to deposition and elution ratio, by the methods described above. The results are shown in Table 3 below.

Comparative Examples 1 through 6

(1) To 10.0 g each of the monomer mixtures shown in Table 2 below, 0.01 g of dimethyl 2,2'-azobisisobutyrate as a thermally decomposable initiator was added. The resulting mixtures were each placed in a polypropylene test tube (capacity: 20 ml) and, after the air inside the tube had been replaced with nitrogen, the tubes were tightly sealed. The tubes were then immersed in a constant-temperature water bath at 55° C. for 24 hours to effect polymerization, and then transferred to a hot air circulating heating apparatus at 100° C., where the tubes were kept for 2 hours to complete polymerization. After cooling, the resulting copolymers were taken out from the tubes.

(2) The copolymers obtained in (1) above were each formed into test specimens (ocular lens materials) and soft contact lenses, by the methods described above, and then tested or evaluated for the water-retaining capability, tensile strength, Young's modulus, oxygen permeability, transparency (light transmittance and haze value), resistance to deposition and elution ratio, by the methods described above. The results are shown in Table 3 below.

Reference Examples 1 through 5

(1) To 10.0 g each of the monomer mixtures shown in Table 2 below, 0.01 g of dimethyl 2,2'-azobisisobutyrate as a thermally decomposable initiator was added. The resulting mixtures were each placed in a polypropylene test tube (capacity: 20 ml) and, after the air inside the tube had been replaced with nitrogen, the tubes were tightly sealed. The tubes were then immersed in a constant-temperature water bath at 55° C. for 24 hours to effect polymerization, and then transferred to a hot air circulating heating apparatus at 100° C., where the tubes were kept for 2 hours to complete polymerization. After cooling, the resulting copolymers were taken out from the tubes.

(2) The copolymers obtained in (1) above were each formed into test specimens (ocular lens materials) and soft contact lenses, by the methods described above, and then tested or evaluated for the water-retaining capability, tensile strength, Young's modulus, oxygen permeability, transparency (light transmittance and haze value), resistance to deposition and elution ratio, by the methods described above. The results are shown in Table 3 below.

The Reference Examples 1 through 5 correspond to the afore-described Japanese Patent Application Laid-open No. 278832/1997, or similar thereto.

In Table 2 below, N-vinyllactam (A), fluorine-containing unsaturated monomers (B), hydrophilic (meth)acrylamides (C), (meth)acryl-based crosslinking agents (D), dicarboxylic acid divinyl esters (E) and other monomers are described by using abbreviations as shown in Table 1 below.

TABLE 1

| Abbreviation | Compound |
|---|---|
| N-vinyllactam (A) | |
| NVP: N-vinyl-2-pyrrolidone | |
| Fluorine-containing unsaturated monomers (B) | |
| 3FM: $CH_2=C(CH_3)\text{-}COO\text{-}CH_2\text{-}CF_3$ | |
| 4FM: $CH_2=C(CH_3)\text{-}COO\text{-}CH_2\text{-}CF_2\text{-}CF_2H$ | |
| 8FM: $CH_2=C(CH_3)\text{-}COO\text{-}CH_2\text{-}CF_2CF_2CF_2\text{-}CF_2H$ | |
| 16FA: $CH_2=CH\text{-}COO\text{-}(CH_2)2\text{-}(CF_2)7\text{-}CF_2H$ | |
| Hydrophilic (meth)acrylamides (C) | |
| DMAA: N,N-dimethylacrylamide | |
| ACMO: N-acryloylmorpholine | |
| HMAA: N-hydroxymethylacrylamide | |
| (Meth)acryl-based crosslinking agents (D) | |
| EGDMA: ethylene glycol dimethacrylate | |
| HD: 1,6-hexanediol dimethacrylate | |
| Dicarboxylic acid divinyl esters (E) | |
| ADVy: divinyl adipate | |

TABLE 1-continued

| Abbreviation | Compound |
|---|---|
| FUVy: divinyl phthalate | |
| Other monomers | |
| MMA: methyl methacrylate | |
| MAVy: vinyl methacrylate | |
| ADAL: diallyl adipate | |
| FUAL: diallyl phthalate | |
| TAAL: diallyl tartrate | |

TABLE 2

| | Composition of monomer mixture (content of monomers) (parts by weight) | | | | | | | | | | | | |
|---|---|---|---|---|---|---|---|---|---|---|---|---|---|
| | N-vinyllactam (A) | | Fluorine-containing unsaturated monomer (B) | | Hydrophilic (meth)-acrylamide (C) | | (Meth)acryl-based crosslinking agent (D) | | Dicarboxylic acid divinyl ester (E) | | Other Monomer | | Other crosslinking agent | |
| | Type | Amount | Type | Amount | Type | Amount | Type | Amount | Type | Amount | Type | Amount | Type | Amount |
| Example | | | | | | | | | | | | | | |
| 1 | NVP | 44.8 | 8FM | 34.8 | DMAA | 19.8 | EGDMA | 0.3 | ADVy | 0.3 | — | — | — | — |
| 2 | NVP | 49.8 | 8FM | 29.8 | DMAA | 19.8 | EGDMA | 0.3 | ADVy | 0.3 | — | — | — | — |
| 3 | NVP | 49.8 | 4FM | 29.8 | DMAA | 19.8 | EGDMA | 0.3 | ADVy | 0.3 | — | — | — | — |
| 4 | NVP | 49.8 | 8FM | 29.8 | DMAA | 19.8 | EGDMA | 0.3 | FUVy | 0.3 | — | — | — | — |
| 5 | NVP | 49.8 | 8FM | 29.8 | DMAA | 19.8 | HD | 0.3 | ADVy | 0.3 | — | — | — | — |
| 6 | NVP | 49.8 | 8FM | 29.8 | DMAA | 19.8 | HD | 0.3 | FUVy | 0.3 | — | — | — | — |
| 7 | NVP | 53.8 | 8FM | 25.8 | ACMO | 19.8 | EGDMA | 0.3 | ADVy | 0.3 | — | — | — | — |
| 8 | NVP | 49.8 | 8FM | 29.8 | ACMO | 19.8 | EGDMA | 0.3 | ADVy | 0.3 | — | — | — | — |
| 9 | NVP | 49.8 | 8FM | 29.8 | ACMO | 19.8 | EGDMA | 0.3 | FUVy | 0.3 | — | — | — | — |
| 10 | NVP | 49.8 | 8FM | 29.8 | ACMO | 19.8 | HD | 0.3 | ADVy | 0.3 | — | — | — | — |
| 11 | NVP | 49.8 | 8FM | 29.8 | ACMO | 19.8 | HD | 0.3 | FUVy | 0.3 | — | — | — | — |
| 12 | NVP | 59.7 | 8FM | 29.8 | HMAA | 9.9 | EGDMA | 0.3 | ADVy | 0.3 | — | — | — | — |
| Comparative Example | | | | | | | | | | | | | | |
| 1 | NVP | 49.8 | — | — | DMAA | 19.8 | EGDMA | 0.3 | ADVy | 0.3 | MMA | 29.8 | — | — |
| 2 | NVP | 49.8 | — | — | DMAA | 19.8 | EGDMA | 0.3 | — | — | MMA | 29.8 | ADAL | 0.3 |
| 3 | NVP | 49.8 | — | — | DMAA | 19.8 | — | — | — | — | MMA | 29.8 | MAVy | 0.3 |
| 4 | NVP | 79 | — | — | — | — | EGDMA | 0.5 | — | — | MMA | 20 | TAAL | 0.5 |
| 5 | NVP | 69.9 | — | — | — | — | — | — | — | — | MMA | 30 | MAVy | 0.1 |
| 6 | — | — | 3FM | 10 | DMAA | 42 | EGDMA | 0.6 | — | — | MMA | 17.4 | — | — |
| | | | 16FA | 30 | | | | | | | | | | |
| Reference Example | | | | | | | | | | | | | | |
| 1 | NVP | 49.8 | 8FM | 29.8 | DMAA | 19.8 | EGDMA | 0.3 | — | — | — | — | — | — |
| 2 | NVP | 49.8 | 8FM | 29.8 | DMAA | 19.8 | — | — | ADVy | 0.3 | — | — | — | — |
| 3 | NVP | 49.8 | 8FM | 29.8 | DMAA | 19.8 | EGDMA | 0.3 | — | — | — | — | ADAL | 0.3 |
| 4 | NVP | 49.8 | 8FM | 29.8 | DMAA | 19.8 | EGDMA | 0.3 | — | — | — | — | FUAL | 0.3 |
| 5 | NVP | 49.8 | 8FM | 29.8 | DMAA | 19.8 | — | — | — | — | — | — | MAVy | 0.3 |

TABLE 3

| | Properties of ocular lens material | | | Properties of soft contact lens | | | | Elution Ratio | |
|---|---|---|---|---|---|---|---|---|---|
| | Water-retaining capability (% by weight) | Tensile Strength (g/mm²) | Young's modulus (g/mm²) | Oxygen transmission rate[1)] | Light transmittance (%) | Haze Value (%) | Resistance to deposition | Distilled Water (%) | Methanol (%) |
| Example | | | | | | | | | |
| 1 | 67 | 322 | 64 | 55 × 10⁻¹¹ | 99.4 | 0.1 | ⊚ | 0 | 1.9 |
| 2 | 73 | 165 | 40 | 62 × 10⁻¹¹ | 99.5 | 0.3 | ⊚ | 0 | 1.5 |
| 3 | 63 | 400 | 150 | 45 × 10⁻¹¹ | 99.6 | 0.2 | ⊚ | 0 | 1.7 |
| 4 | 72 | 186 | 56 | 65 × 10⁻¹¹ | 99.5 | 0.3 | ⊚ | 0 | 1.8 |
| 5 | 69 | 182 | 50 | 62 × 10⁻¹¹ | 99.5 | 0.3 | ⊚ | 0 | 1.7 |
| 6 | 68 | 191 | 58 | 67 × 10⁻¹¹ | 99.5 | 0.3 | ⊚ | 0 | 1.7 |
| 7 | 67 | 200 | 49 | 49 × 10⁻¹¹ | 99.6 | 0.2 | ⊚ | 0 | 1.9 |
| 8 | 63 | 348 | 96 | 45 × 10⁻¹¹ | 99.5 | 0.3 | ⊚ | 0 | 1.7 |
| 9 | 61 | 350 | 97 | 45 × 10⁻¹¹ | 99.5 | 0.3 | ⊚ | 0 | 1.8 |
| 10 | 59 | 371 | 99 | 47 × 10⁻¹¹ | 99.5 | 0.3 | ⊚ | 0 | 2.1 |
| 11 | 59 | 389 | 100 | 49 × 10⁻¹¹ | 99.5 | 0.3 | ⊚ | 0 | 1.9 |
| 12 | 66 | 356 | 110 | 45 × 10⁻¹¹ | 99.5 | 0.2 | ⊚ | 0 | 2.0 |
| Comparative Example | | | | | | | | | |
| 1 | 73 | 97 | 29 | 62 × 10⁻¹¹ | 93.3 | 0.3 | X | 1.5 | 4.0 |
| 2 | 72 | 90 | 30 | 61 × 10⁻¹¹ | 93.5 | 0.2 | X | 1.7 | 4.4 |
| 3 | 74 | 89 | 28 | 63 × 10⁻¹¹ | 93.8 | 0.3 | X | 1.6 | 4.5 |
| 4 | 75.4 | 186 | 52 | 56 × 10⁻¹¹ | 99.5 | 0.2 | X | 0.8 | 3.4 |
| 5 | 70.4 | 150 | 60 | 52 × 10⁻¹¹ | 99.6 | 0.3 | X | 1.1 | 4.9 |
| 6 | 45 | 426 | 283 | 19.5 × 10⁻¹¹ | 97.0 | 0.4 | ⊚ | 0 | 1.0 |
| Reference Example | | | | | | | | | |
| 1 | 71 | 165 | 40 | 62 × 10⁻¹¹ | 99.5 | 0.3 | ⊚ | 4.4 | 6.0 |
| 2 | 70 | 170 | 45 | 65 × 10⁻¹¹ | 95.1 | 1.4 | ⊚ | 2.0 | 10.0 |
| 3 | 68 | 182 | 42 | 60 × 10⁻¹¹ | 99.3 | 0.3 | ⊚ | 1.0 | 4.0 |
| 4 | 69 | 180 | 42 | 59 × 10⁻¹¹ | 99.4 | 0.2 | ⊚ | 1.3 | 3.8 |
| 5 | 73 | 160 | 42 | 60 × 10⁻¹¹ | 79.0 | 2.8 | ⊚ | 0.9 | 4.3 |

[1)]Unit of oxygen transmission rate: cc − cm/cm² · sec · mmHg.

The followings will be understood from the results given in Tables 2 and 3. The ocular lens materials and ocular lenses (soft contact lenses) obtained in Examples 1 through 12 have markedly low elution ratios and, in particular, 0% elution ratio in distilled water, thus causing substantially no eluates to form therefrom. The ocular lens materials and ocular lenses therefore need no extraction treatment to remove contained eluates and can be used as they are as ocular lenses directly.

Furthermore, the ocular lens materials and ocular lenses (soft contact lenses) obtained in Examples 1 through 12 have a high water-retaining capability of at least 59% by weight, a high tensile strength of at least 165 kg/mm², a Young's modulus of 40 to 150 g/mm², a high oxygen transmission rate of at least 45×10⁻¹¹ cc·cm/cm² sec·mmHg, a high light transmittance of at least 99%, a low haze value of not more than 0.3% and good resistance to deposition, thus proving excellent in mechanical strength, durability, flexibility, comfort during wear, transparency, ability to correct visual acuity, safety and handling, and are hence very useful.

On the other hand, the ocular lens materials and soft contact lenses containing no fluorine-containing unsaturated monomer (B), i.e. those obtained in Comparative Example 1 (ocular lens material and soft contact lens obtained from a monomer mixture containing an N-vinyllactam (A), a hydrophilic (meth)acrylamide (C), a (meth)acryl-based crosslinking agent (D) and a dicarboxylic acid divinyl ester (E)); those obtained in Comparative Example 2 (ocular lens material and soft contact lens obtained from a monomer mixture containing an N-vinyllactam (A), a hydrophilic (meth)acrylamide (C), and a (meth)acryl-based crosslinking agent (D)); and those obtained in Comparative Example 3 (ocular lens material and soft contact lens obtained from a monomer mixture containing an N-vinyllactam (A) and a hydrophilic (meth)acrylamide (C)), all have a low tensile strength and Young's modulus, thus proving inferior in mechanical strength and flexibility, have poor resistance to deposition and are poor in transparency and elution ratio as compared with Examples 1 through 12. These ocular lens materials and ocular lenses are therefore of low practical value.

Besides, the ocular lens materials and soft contact lenses obtained in Comparative Examples 4 and 5, which correspond to Japanese Patent Application Laid-open No. 3487/1975 or 105992/1977 are inferior to those obtained in Examples 1 through 12 in resistance to deposition and elution ratio. The ocular lens material and soft contact lens obtained in Comparative Example 6, which corresponds to Japanese Patent Application Laid-open No. 293520/1988 have higher Young's modulus than those obtained in Examples 1 through 12, thus having poor flexibility, and are of low practical value.

It is also understood from comparison between the results of Examples 1 through 12 and those of Reference Examples 1 through 5, in Tables 2 and 3, further improvement of no eluates (markedly low elution ratio) is realized in the ocular lens materials and ocular lenses of Examples 1 through 12 over those of Reference Examples 1 through 5, which have excellent water-retaining capability, tensile strength, flexibility, oxygen permeability and resistance to deposition.

Obviously, numerous modifications and variations of the present invention are possible in light of the above teachings. It is therefore to be understood that within the scope of the appended claims, the invention may be practiced otherwise than as specifically described herein.

The priority document of the present application, Japanese patent Application 73146/1998, filed Mar. 6, 1998, is hereby incorporated by reference.

What is claimed is:

1. A copolymer prepared by polymerizing a monomer mixture comprising:
   (A) an N-vinyllactam;
   (B) a fluoroalkyl (meth)acrylate;
   (C) a (meth)acrylamide represented by formula (II):

$$CH_2=C(R^2)-CO-N(R^3)(R^4) \qquad (II)$$

wherein
   $R^2$ represents a hydrogen atom or methyl group; and
   $R^3$ and $R^4$ each independently represents a hydrogen atom, an alkyl group having 1 to 4 carbon atoms or an alkyl group with a hydroxyl group having 1 to 4 carbon atoms, or $R^3$ and $R^4$ together represent an alkylene group represented by the formula $-(CH_2)_p-$, wherein p is an integer of 4 to 6, or a divalent group represented by the formula $-(CH_2)_2-O-(CH_2)_2-$;
   (D) a crosslinking agent having at least 2 (meth) acryloyloxy groups; and
   (E) a dicarboxylic acid divinyl ester.

2. An ocular lens material comprising the copolymer of claim 1.

3. The ocular lens material according to claim 2, wherein said monomer mixture comprises, based on the total weight thereof, 35 to 70% by weight of said N-vinyllactam, 20 to 50% by weight of said fluoroalkyl (meth)acrylate, 5 to 40% by weight of said (meth)acrylamide of formula (II), 0.01 to 1% by weight of said crosslinking agent and 0.01 to 1% by weight of said dicarboxylic acid divinyl ester.

4. The ocular lens material according to claim 2, wherein said fluorine-containing unsaturated monomer (B) is a fluoroalkyl (meth)acrylate.

5. The ocular lens material according to claim 4, wherein said fluoroalkyl (meth)acrylate is represented by the following formula (I):

$$CH_2=C(R^1)-COO-(CH_2)_m-(CF_2)_n-CF_2H \qquad (I)$$

wherein $R^1$ represents a hydrogen atom or methyl group, m represent an integer of 1 to 4, and n represent an integer of 1 to 10.

6. The ocular lens material according to claim 2, wherein said (meth)acrylamide of formula (II) is at least one member selected from the group consisting of acrylamide, N,N-dimethylacrylamide, N-hydroxymethylacrylamide and N-acryloylmorpholine.

7. The ocular lens material according to claim 2, wherein said (meth)acrylamide of formula (II) is N-acryloylmorpholine.

8. The ocular lens material according to claim 3, wherein said (meth)acrylamide of formula (II) is N-acryloylmorpholine, and
said fluoroalkyl (meth)acrylate is represented by formula (I):

$$CH_2=C(R^1)-COO-(CH_2)_m-(CF_2)_n-CF_2H \qquad (I)$$

wherein $R^1$ represents a hydrogen atom or methyl group, m represents an integer of 1 to 4, and n represents an integer of 1 to 10.

9. A process for producing ocular lens materials, which comprises polymerizing a monomer mixture comprising:
   (A) an N-vinyllactam;
   (B) a fluoroalkyl (meth)acrylate;
   (C) a (meth)acrylamide represented by formula (II):

$$CH_2=C(R^2)-CO-N(R^3)(R^4) \qquad (II)$$

wherein
   $R^2$ represents a hydrogen atom or methyl group; and
   $R^3$ and $R^4$ each independently represents a hydrogen atom, an alkyl group having 1 to 4 carbon atoms or an alkyl group with a hydroxyl group having 1 to 4 carbon atoms, or $R^3$ and $R^4$ together represent an alkylene group represented by the formula $-(CH_2)_p-$, wherein p is an integer of 4 to 6, or a divalent group represented by the formula $-(CH_2)_2-O-(CH_2)_2-$;
   (D) a crosslinking agent having at least 2 (meth) acryloyloxy groups;
   (E) a dicarboxylic acid divinyl ester; and an initiator.

10. The process according to claim 9, wherein said initiator is a thermally decomposable initiator having a 10-hour half-life temperature of at least 50° C.

11. The process for producing ocular lens materials according to claim 10, wherein said monomer mixture contains, based on the total weight thereof, 35 to 70% by weight of said N-vinyllactam, 20 to 50% by weight of said fluoroalkyl (meth)acrylate, 5 to 40% by weight of said (meth)acrylamide of formula (II), 0.01 to 1% by weight of said crosslinking agent and 0.01 to 1% by weight of said dicarboxylic acid divinyl ester.

12. The process according to claim 11, wherein said polymerization is conducted at a temperature of at least 40° C.

13. An ocular lens material prepared by the process of claim 9.

14. An ocular lens material prepared by the process of claim 10.

15. An ocular lens material prepared by the process of claim 11.

16. An ocular lens material prepared by the process of claim 12.

17. A monomer mixture, comprising:
   (A) an N-vinyllactam;
   (B) a fluoroalkyl (meth)acrylate;
   (C) a (meth)acrylamide represented by formula (II):

$$CH_2=C(R^2)-CO-N(R^3)(R^4) \qquad (II)$$

wherein
   $R^2$ represents a hydrogen atom or methyl group; and
   $R^3$ and $R^4$ each independently represents a hydrogen atom, and alkyl group having 1 to 4 carbon atoms or an alkyl group having 1 to 4 carbon atoms, or $R^3$ and $R^4$ together represent an alkylene group represented by the formula $-(CH_2)_p-$, wherein p is an integer of 4 to 6, or a divalent group represented by the formula $-(CH_2)_2-O-(CH_2)_2-$;
   (D) a crosslinking agent having at least 2 (meth) acryloyloxy groups; and
   (E) a dicarboxylic acid divinyl ester.

18. The monomer mixture of claim 17, wherein said monomer mixture comprises, based on the total weight thereof, 35 to 70% by weight of said N-vinyllactam (A), 20 to 50% by weight of said fluorine-containing unsaturated monomer (B), 5 to 40% by weight of said hydrophilic (meth)acrylamide (C), 0.01 to 1% by weight of said crosslinking agent (D) and 0.01 to 1% by weight of said dicarboxylic acid divinyl ester (E), said hydrophilic (meth)acrylamide (C) is N-acryloylmorpholine, and said fluorine-containing unsaturated monomer (B) is a fluoroalkyl (meth)acrylate represented by the following formula (I):

$$CH_2=C(R^1)-COO-(CH_2)_m-(CF_2)_n-CF_2H \quad (I)$$

wherein $R^1$ represents a hydrogen atom or methyl group, m represent an integer of 1 to 4, and n represent an integer of 1 to 10.

19. A method of making a monomer mixture comprising:
mixing together
(A) an N-vinyllactam;
(B) a fluoroalkyl (meth)acrylate;
(C) a hydrophilic (meth)acrylamide represented by formula (II):

$$CH_2=C(R^2)-CO-N(R^3)(R^4) \quad (I)$$

wherein $R^2$ represents a hydrogen atom or methyl group; and $R^3$ and $R^4$ each independently represents a hydrogen atom, an alkyl group having 1 to 4 carbon atoms or an alkyl group with a hydroxyl group having 1 to 4 carbon atoms, or $R^3$ and $R^4$ together represent an alkylene group represented by the formula $-(CH_2)_p-$, wherein p is an integer of 4 to 6, or a divalent group represented by the formula $-(CH_2)_2-(CH_2)_2-$;

(D) a crosslinking agent having at least 2 (meth) acryloyloxy groups; and (E) a dicarboxylic acid divinyl ester.

20. A monomer mixture, prepared by the method of claim 19.

* * * * *